(12) United States Patent
Smolenski et al.

(10) Patent No.: US 8,210,577 B2
(45) Date of Patent: Jul. 3, 2012

(54) CONNECTING SYSTEM FOR TELESCOPINGLY ENGAGED ELEMENTS AND METHOD OF MAINTAINING THE ELEMENTS TOGETHER USING THE SYSTEM

(75) Inventors: Mark Smolenski, Steamwood, IL (US); Michael G. Comerford, Lake Geneva, WI (US); Larry N. Will, Bella Vista, AR (US); Gary A. Brycki, Marengo, IL (US)

(73) Assignee: Echo, Incorporated, Lake Zurich, IL (US)

( * ) Notice: Subject to any disclaimer, the term of this patent is extended or adjusted under 35 U.S.C. 154(b) by 0 days.

(21) Appl. No.: 10/646,323

(22) Filed: Aug. 22, 2003

(65) Prior Publication Data

US 2005/0040648 A1 Feb. 24, 2005

(51) Int. Cl.
*F16L 19/00* (2006.01)
(52) U.S. Cl. ........................................ 285/361; 285/402
(58) Field of Classification Search ............... 403/359.1, 403/103, 359.3, 104, 359.6, 106, 348–350, 403/107, 109.1, 109.2, 109.5, 109.8, 3, 59.6; 15/104.03; 55/374; 285/360, 361, 379, 396, 285/402
See application file for complete search history.

(56) References Cited

U.S. PATENT DOCUMENTS

| | | | | |
|---|---|---|---|---|
| 1,099,670 A | * | 6/1914 | Shoffner | 403/349 |
| 1,476,119 A | * | 12/1923 | Nagell | 285/361 |
| 1,951,754 A | * | 3/1934 | Gilbert | 403/108 |
| 3,803,532 A | * | 4/1974 | Taxon | 285/361 |
| 4,046,279 A | * | 9/1977 | Rosler | 220/8 |
| 4,157,153 A | * | 6/1979 | Barnes | 285/361 |
| 4,911,573 A | * | 3/1990 | Pietro | 403/349 |
| 5,054,159 A | * | 10/1991 | Richardson | 15/400 |
| 5,926,910 A | * | 7/1999 | Nishimura et al. | 15/415.1 |
| 6,108,865 A | * | 8/2000 | Veser et al. | 285/402 |
| 6,447,021 B1 | * | 9/2002 | Haynes | 285/302 |
| 6,811,190 B1 | * | 11/2004 | Ray et al. | 285/402 |
| 6,908,250 B2 | * | 6/2005 | Moffatt | 403/109.2 |
| 2003/0151251 A1 | * | 8/2003 | Barnoff | 285/361 |

* cited by examiner

*Primary Examiner* — Michael P Ferguson
*Assistant Examiner* — Gwendolyn Driggers
(74) *Attorney, Agent, or Firm* — Wood, Phillips, Katz, Clark & Mortimer

(57) ABSTRACT

The combination of a) a first tubular element with a first axis, a first portion with a radially outwardly facing surface and a first connecting assembly with a first circumferentially facing surface and b) a second tubular element with a second portion with a second axis, a radially inwardly facing surface, and a second connecting assembly with a second circumferentially facing surface. The first portion is extendable within the second portion. The first and second tubular elements are movable around the first and second axes between a) a first relative rotational position and b) a second relative rotational position such that the first and second connecting assemblies cooperate to draw the first and second portions axially towards each other and the first and second circumferentially facing surfaces confront each other to thereby block relative movement back into the first relative rotational position.

23 Claims, 14 Drawing Sheets

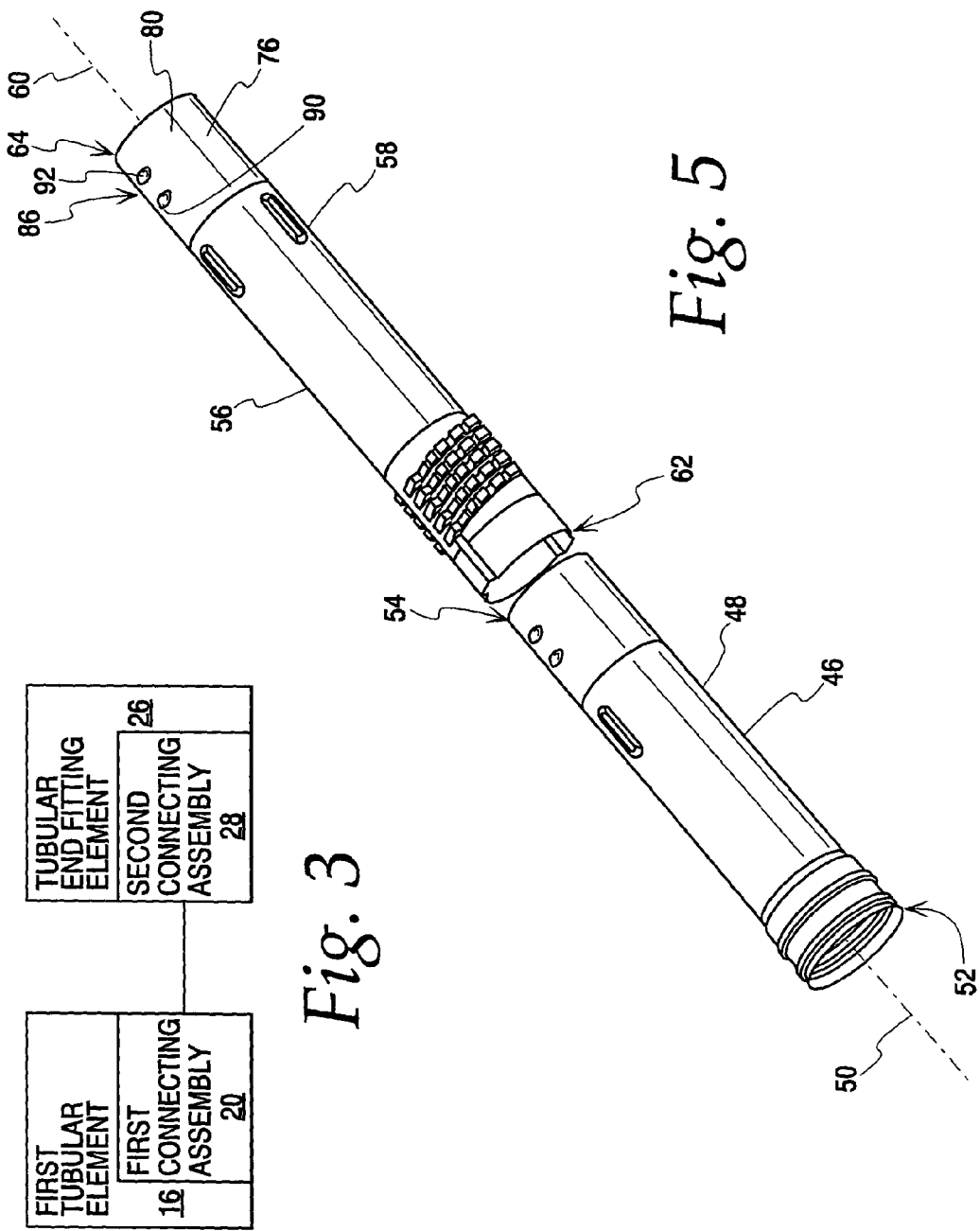

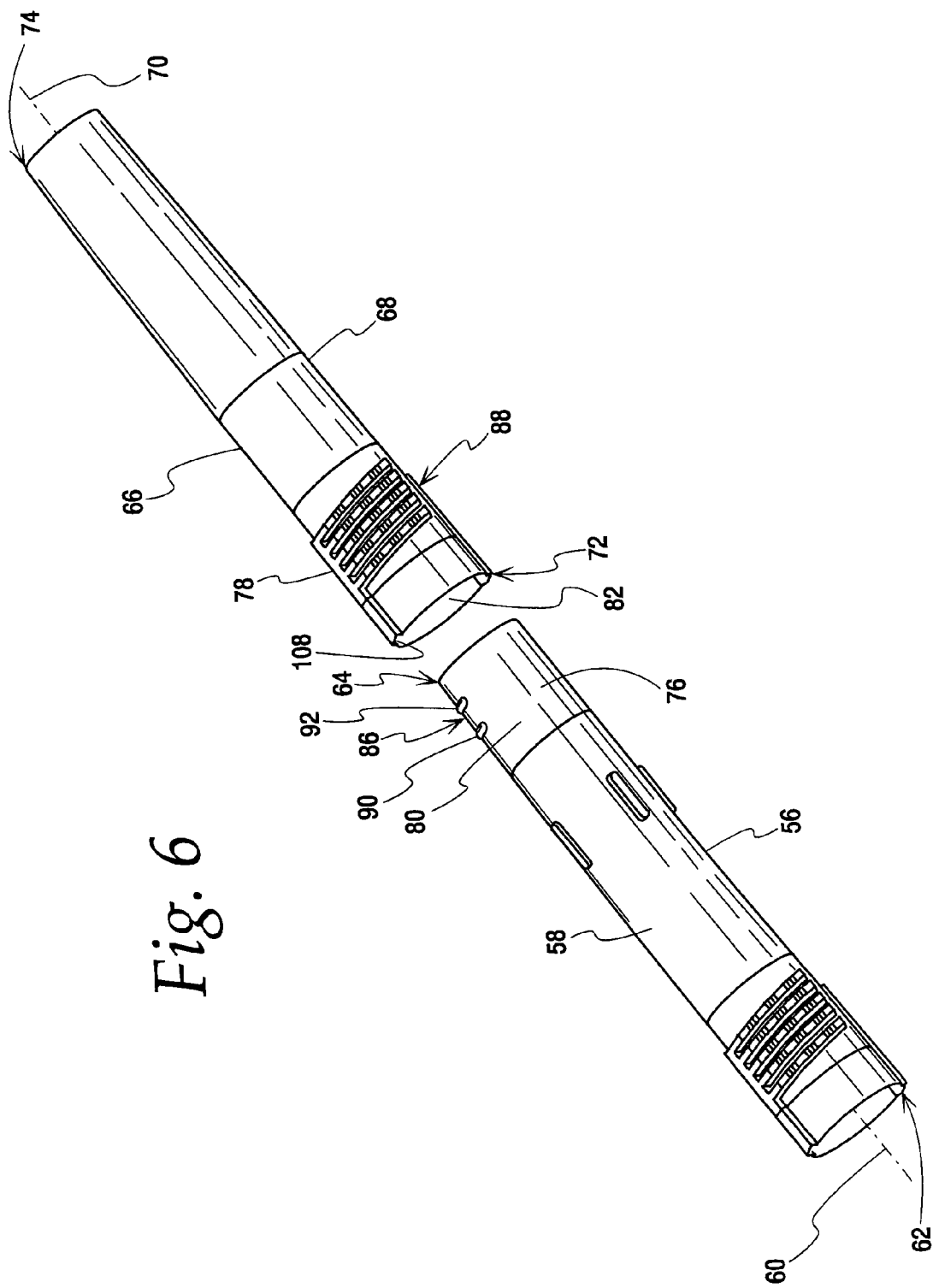

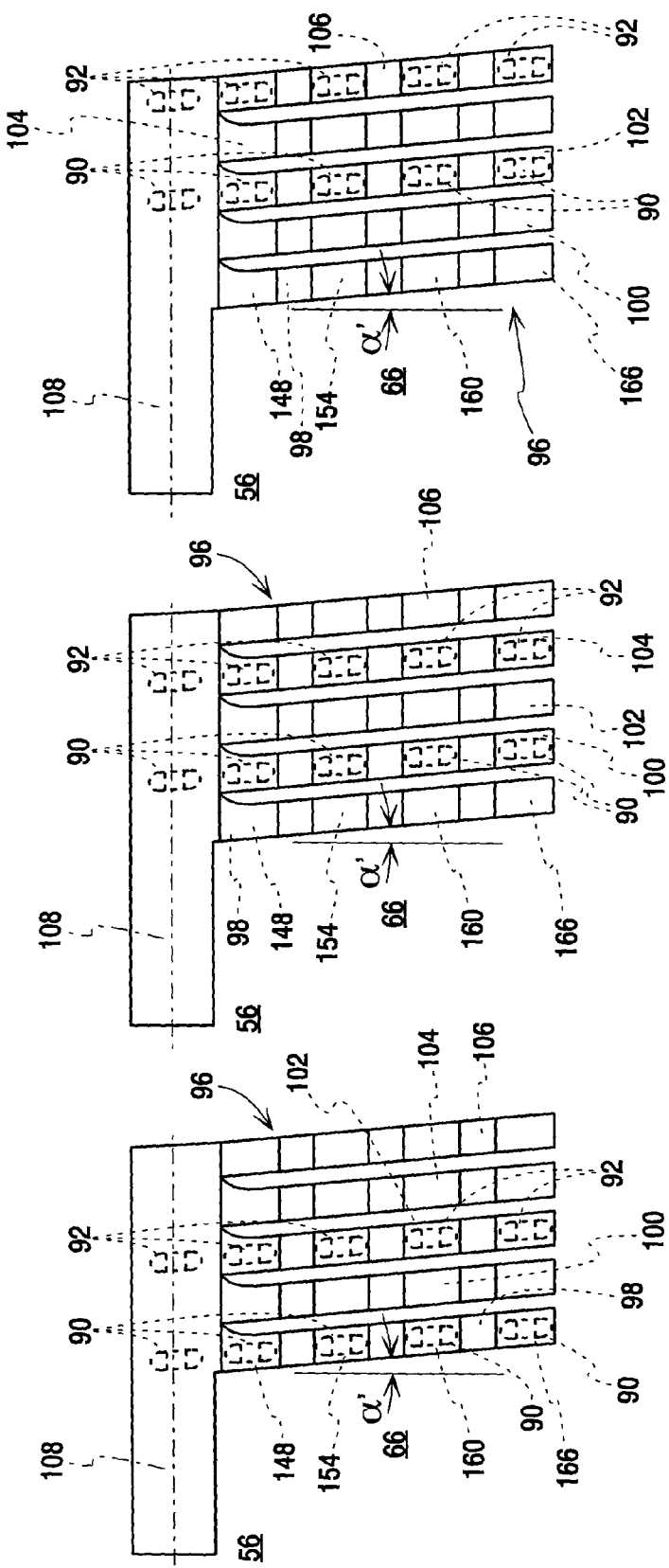

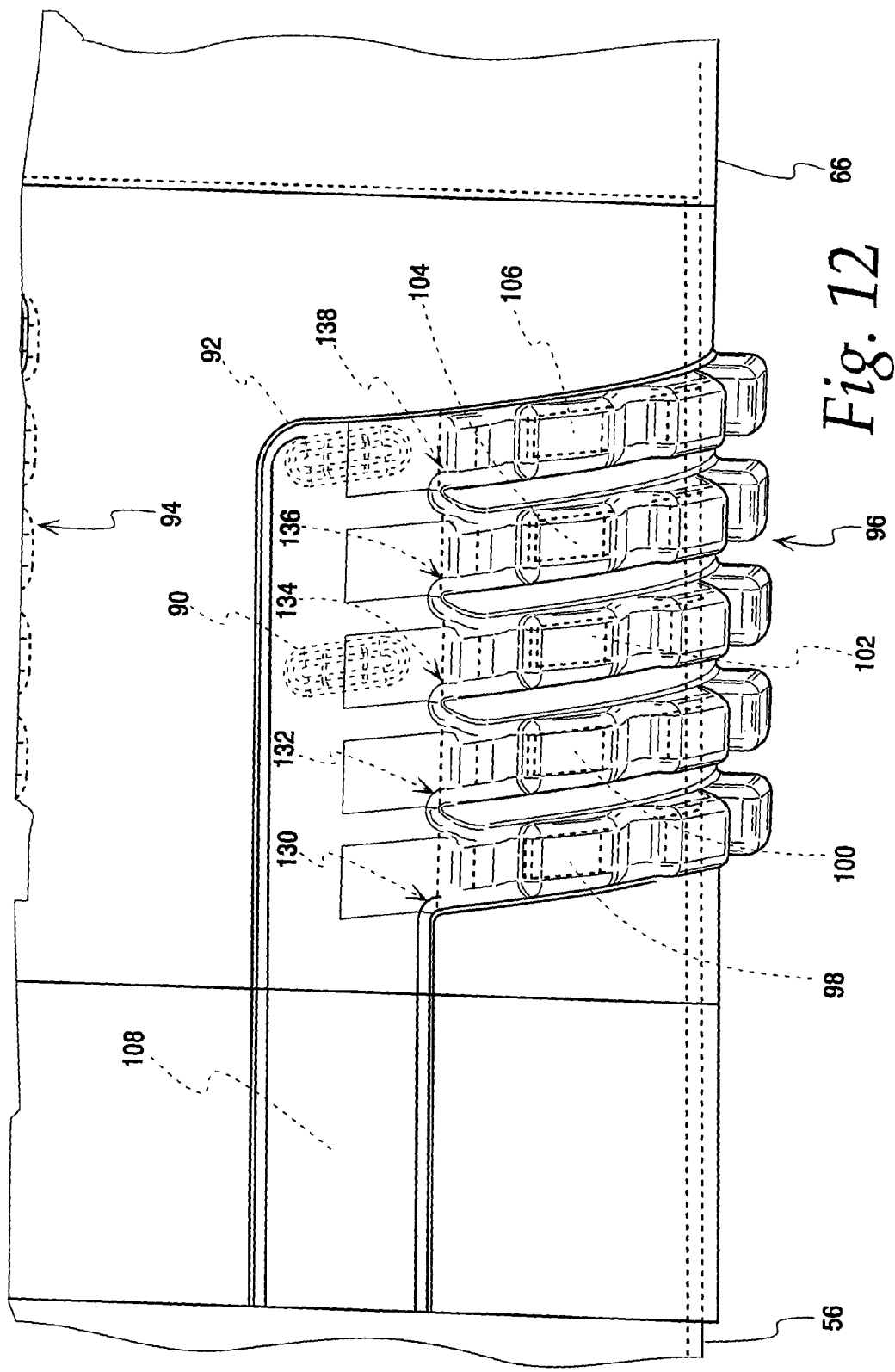

CONNECTING SYSTEM FOR TELESCOPINGLY ENGAGED ELEMENTS AND METHOD OF MAINTAINING THE ELEMENTS TOGETHER USING THE SYSTEM

BACKGROUND OF THE INVENTION

1. Field of the Invention

This invention relates to telescopingly engaged elements, such as tubular elements that define a fluid discharge path and, more particularly, to a connecting system which allows the elements to be maintained operatively connected in a plurality of different relative positions. The invention is further directed to a method of maintaining the elements together using such a system.

2. Background Art

Tubular elements are commonly telescopingly engaged in a plurality of different environments. As one example, tubular elements are engaged in this manner to define a discharge path for forced air developed by blowers used in the landscaping industry. These blowers are made with a number of different configurations, ranging from back mounted to hand held.

In these blowers, telescoping connections are established between: a) tubular sections and fittings on the housing for the mechanism generating the forced air; b) two or more tubular sections joined to produce a combined desired length; and c) tubular sections and end fittings used to control the ultimate discharge pattern at the point of use of the fluid. It is common to construct the telescoped portions of the above components from relatively thin-walled plastic material. The external surfaces of the male portions are dimensioned to be closely received within the surrounding female surfaces at each connection.

Maintenance of each such connection has heretofore been accomplished in a number of different manners. In one mechanism, the male and female surfaces are maintained together solely through frictional forces generated therebetween. In another form, a bayonet-type connection is established between the male and female portions. It is also known to use threaded connections.

Heretofore, problems have been encountered in maintaining the integrity of these connections. Those connections relying entirely on friction may be affected by surface wear after repeated assembly/disassembly processes. The wear may reach the point that one of the sections and/or fittings may blow off during use. This may lead the operator to jury-rig the connections, as by either permanently bonding the same or utilizing tape to hold the elements together. This defeats the desired separation capability for the tubular sections and associated fittings.

The same type of problem may be encountered with the bayonet-type connections and still other connections currently being utilized. With the bayonet-type connections, the repetitive assembly and disassembly steps may wear surfaces to the point that the joined elements become loosely engaged. This may produce undesirable rattle and could potentially result in a separation of parts during use.

The above types of systems present challenges to designers that must balance oft times competing objectives. Cost is always a consideration in the design process. It is know to make the tubular elements by different manufacturing processes. For example, tubular elements may be made using injection molding or blow molding techniques. Generally, closer dimensional tolerances can be maintained using an injection molding process. While tolerances can be maintained fairly closely with blow molding on the external surfaces of these parts, the same accuracy is generally not achievable on the inside surfaces. Variations from optimal dimensions can be significant, particularly with components having closely matched, cooperating male and female surfaces that are maintained together, solely or primarily, by frictional holding forces. If the surface is made so that the connection is too tightly held, separation of the parts may be difficult. If the connection is too loose, the elements are prone to rattling or being inadvertently separated during use.

The industry continues to seek out connecting mechanisms that operate effectively for the useful life of equipment and which at the same time can be produced at a reasonable cost.

SUMMARY OF THE INVENTION

In one form, the invention is directed to the combination of a first tubular element and a second tubular element. The first tubular element has a first axis, a first portion with a radially outwardly facing surface and a first connecting assembly with a first circumferentially facing surface. The second tubular element has a second portion with a second axis, a radially inwardly facing surface, and a second connecting assembly with a second circumferentially facing surface. The first portion is extendable within the second portion so that the radially inwardly facing surface on the second tubular element surrounds the radially outwardly facing surface on the first tubular element. The first and second tubular elements are positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other. The first and second connecting assemblies cooperate so that the first and second circumferentially facing surfaces confront each other with the first and second tubular elements in the second relative rotational position to thereby block relative movement of the first and second tubular elements from the second relative rotational position back into the first relative rotational position.

In one form, one of the first and second connecting assemblies has a first radially extending projection and the other of the first and second connecting assemblies has a first groove in which the first projection guidingly moves as the first and second tubular elements are changed between the first and second relative rotational positions.

In one form, the first portion has a first radially outwardly extending projection and the second portion has a first groove in which the first projection guidingly moves as the first and second tubular elements are changed between the first and second relative rotational positions.

In one form, the second portion has a first radially inwardly extending projection which extends into the first groove. As the first and second tubular elements are changed from the first relative rotational position into the second relative rotational position, the first radially outwardly extending projection and first inwardly extending projection cooperatively interact so that at least one of a) the first radially outwardly extending projection deforms radially inwardly and b) the first radially inwardly extending projection deforms radially outwardly to allow the first radially outwardly extending projection and first radially inwardly extending projection to move past each other in a circumferential direction to thereby allow the first and second circumferentially facing surfaces to confront each other.

In one form, the second portion has a second radially inwardly extending projection which extends into the first groove and defines a third circumferentially facing surface facing in the same circumferential direction as the second circumferentially facing surface. The first and second tubular elements are repositionable from the first relative rotational position past the second relative rotational position to a third relative rotational position wherein the first and third circumferentially facing surfaces confront each other to thereby block relative movement of the first and second tubular elements from the third relative rotational position back into the second relative rotational position. The first and second connecting assemblies cooperate to draw the first and second portions axially towards each other further with the first and second tubular elements in the third relative rotational position than with the first and second tubular elements in the second relative rotational position.

In one form, the first and second radially inwardly extending projections define a first receptacle therebetween into which the first radially outwardly extending projection extends with the first and second tubular elements in the second relative rotational position. The first receptacle is dimensioned so that the first radially outwardly extending projection is substantially blocked against movement in opposite circumferential directions within the first groove.

In one form, the second tubular element has an axially extending entry groove which is contiguous with the first groove.

In one form, the first and second tubular elements are positionable in a second relative axial position wherein relative movement of the first and second tubular elements from the first relative rotational position into the second relative rotational position causes the first and second connecting assemblies to draw the first and second portions axially towards each other further than with the first and second tubular elements in the first relative axial position and the first and second tubular elements moved from the first relative rotational position into the second relative rotational position.

In one form, the second portion has a second groove in which the first projection guidingly moves as the first and second tubular elements are moved from the first relative rotational position into the second relative rotational position, with the first and second tubular elements in the second relative axial position.

In one form, the first groove has a first axial rise and the second groove has a second axial rise and the first and second axial rises are approximately equal.

In one form, the axially extending entry groove in the second tubular element is contiguous with the first and second grooves.

In one form, the first portion has a second radially outwardly extending projection and the second portion has a second groove in which the second radially outwardly extending projection guidingly moves as the first and second tubular elements are changed between the first and second relative rotational positions.

In one form, the first and second radially outwardly extending projections are at substantially diametrically opposite locations on the first portion.

In another form, the first and second radially outwardly extending projections are at substantially the same circumferential location on the first portion.

The first radially outwardly extending projection may have an elongate shape with a length.

In one form, the length of the first radially outwardly extending projection is directed in a circumferential direction at an angle to a plane orthogonal to the second axis.

In one form, the radially outwardly facing surface on the first tubular element and radially inwardly facing surface on the second tubular element are relatively dimensioned so that the radially outwardly facing surface and radially inwardly facing surface are urged against each other with a frictional force that is greater with the first and second tubular elements in the second relative rotational position than with the first and second tubular elements in the first relative rotational position.

In one form, the first and second portions are each made from a flexible plastic material.

In one form, one of the first and second tubular elements has a fitting for connection to a fluid blower.

The first and second tubular elements may be provided in combination with a fluid blower to which the fitting is connected so that fluid propelled by the fluid blower is directed through the first and second tubular elements.

The invention is further directed to a method of joining first and second tubular elements. The method includes the steps of: providing a first tubular element having a first axis, a first portion with a radially outwardly facing surface, and a first connecting assembly; providing a second tubular element having a second axis, a second portion with a radially inwardly facing surface, and a second connecting assembly; aligning the first and second tubular elements in a preassembly state with the first and second axes substantially coincident and the first portion adjacent to the second portion; relatively axially moving the first and second tubular elements from the preassembly state towards each other into a first relative axial position; and with the first and second tubular elements in the first relative axial position, relatively moving the first and second tubular elements around the first and second axes from a first relative rotational position into a second relative rotational position and thereby causing the first and second connecting assemblies to cooperate so as to draw the first and second portions axially towards each other with the first and second tubular elements in a second relative axial position, wherein a frictional force generated between the first and second portions is greater than with the first and second tubular elements in the first relative axial position. The step of causing the first and second connecting assemblies to cooperate involves causing the first and second connecting assemblies to cooperate to releasably block the first and second tubular elements in the second relative rotational position.

In one form, the step of causing the first and second connecting assemblies to cooperatively releasably block the first and second tubular elements in the second relative position involves causing circumferentially facing surfaces on the first and second connecting assemblies to confront each other.

In one form, the step of causing the first and second connecting assemblies to cooperate may involve causing a projection on one of the first and second connecting assemblies to move in a groove with an axial rise on the other of the first and second connecting assemblies.

In one form, the step of causing the first and second connecting assemblies to cooperate may involve causing a plurality of projections to interact, one each with a plurality of grooves, each with an axial rise.

The method may further include the step of operatively connecting the tubular elements to a fluid blower so that fluid propelled by the fluid blower is directed through the joined first and second tubular elements.

BRIEF DESCRIPTION OF THE DRAWINGS

FIG. 3 is a schematic representation of the first tubular element joined to an end fitting using first and second cooperating connecting assemblies, according to the present invention;

FIG. 5 is an enlarged, exploded, perspective view of the tubular adaptor element and second tubular element of FIG. 4 and showing connecting assemblies, according to the invention, cooperating therebetween;

FIG. 6 is an enlarged, exploded, perspective view of the second tubular element and tubular end fitting element of FIG. 4 and showing connecting assemblies, according to the invention, cooperating therebetween;

FIG. 9 is a fragmentary, flattened view showing the connecting assemblies on the tubular elements in FIG. 8 operatively engaged in a first relative axial position and with the tubular elements moved between five different relative rotational positions, as represented by the dotted line depictions of the projections;

FIG. 10 is a view corresponding to that in FIG. 9 with the tubular elements in a second relative axial position;

FIG. 11 is a view as in FIGS. 9 and 10 with the tubular elements in a third relative axial position;

FIG. 12 is an enlarged, fragmentary, elevation view of the tubular elements in FIGS. 6 and 7, with the tubular elements relatively axially positioned as in FIG. 11 and in a first relative rotational position preparatory to relatively rotationally moving the tubular elements to direct the radially extending projections into the grooves;

DETAILED DESCRIPTION OF THE DRAWINGS

Figure 1:
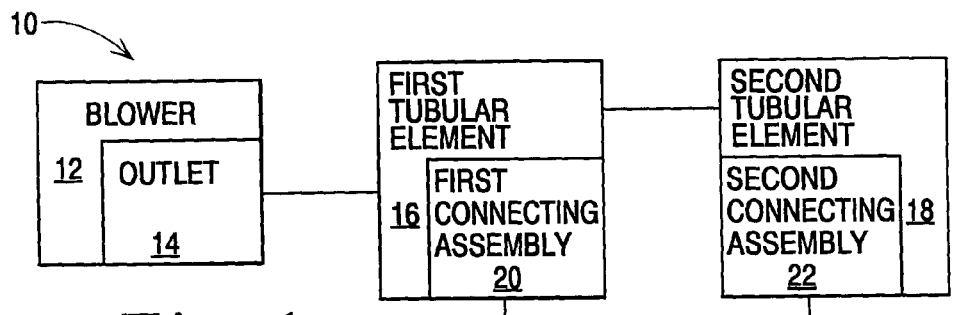
FIG. 1 is a schematic representation of a blower system wherein first and second tubular elements are connected to each other, according to the present invention, utilizing cooperating first and second connecting assemblies, respectively on the first and second tubular elements.

In FIG. 1, a schematic representation of one blower system, with the present invention incorporated, is shown at 10. The blower system 10 consists of a blower 12 which generates forced air that is delivered to an outlet 14. A first tubular element 16 is connected to the outlet 14 so that discharging fluid is communicated through the first tubular element 16. The first tubular element 16 is in turn connected to a second tubular element 18. The connection between the first and second tubular elements 16, 18 is releasably established, according to the invention, through cooperating first and second connecting assemblies 20, 22, provided one each on the first tubular element 16 and second tubular element 18, respectively. It should be understood that the blower 12 could have virtually any of an infinite number of different styles and configurations i.e., back mounted, hand holdable, etc., so long as the same is capable of propelling a fluid through the first and second tubular elements 16, 18.

Figure 2:
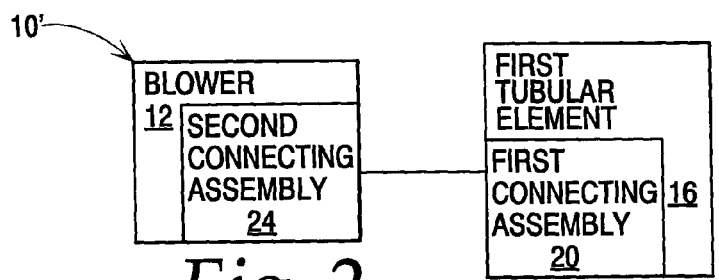
FIG. 2 is a schematic representation of a blower system wherein the first tubular element is connected to the blower using cooperating first and second connecting assemblies, according to the present invention.

In FIG. 2, the inventive structure is shown schematically in a modified form of blower system 10', incorporating the blower 12 and the first tubular element 16. In this inventive embodiment, a second connecting assembly 24, cooperating with the first connecting assembly 20 on the first tubular element 16, is provided on the blower 12.

In FIG. 3, the first tubular element 16 is shown connected to a tubular end fitting element 26 through cooperation between the first connecting assembly 20 and a second connecting assembly 28 on the tubular end fitting element 26.

In each of FIGS. 1-3, the elements are shown schematically so as to represent the inventive concept in a generic sense to encompass variations not shown or specifically described herein. For example, the tubular elements 16, 18 could have myriad different shapes, lengths, thickness, etc., other than those shown for exemplary purposes, herein.

Figure 4:
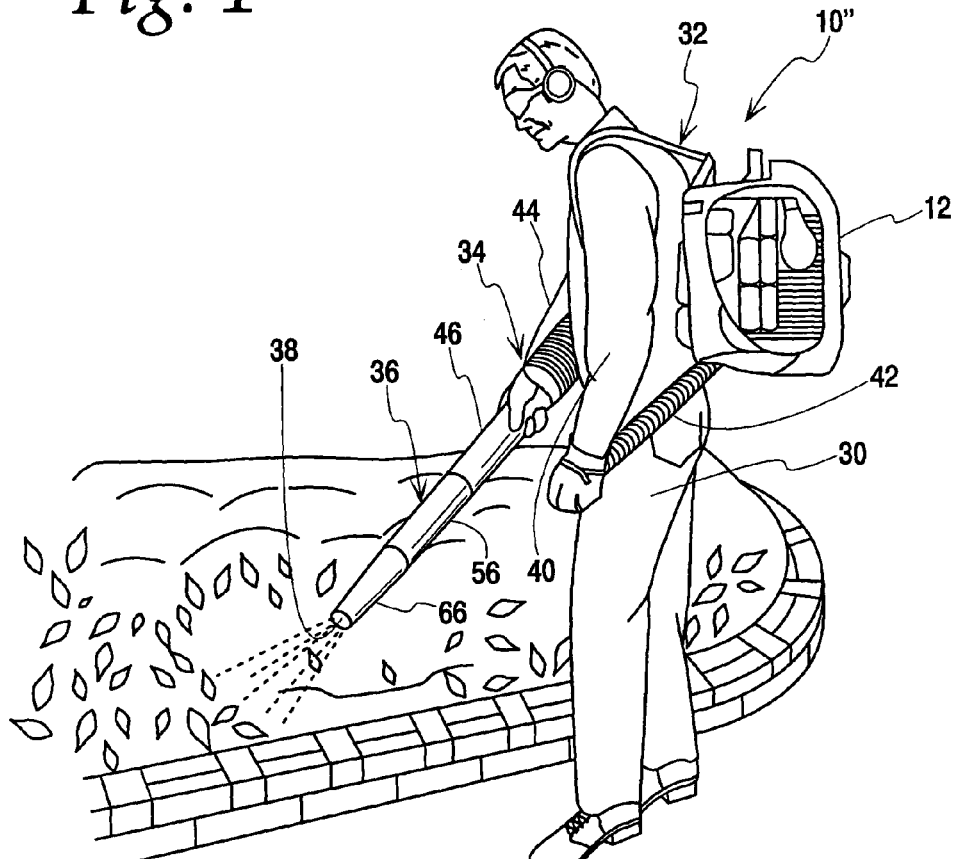
FIG. 4 is a perspective view of one form of back mounted blower system being operated by a user and having a tubular adaptor element joined to a blower, a second tubular element joined to the tubular adaptor element, and a tubular end fitting element joined to the second tubular element, corresponding to these same structures shown in FIGS. 1-3.

An exemplary blower system, incorporating components of the type shown schematically in FIGS. 1-3, is shown at 10" in FIG. 4. The blower system 10" consists of a blower 12 mounted on the back of an operator 30 through a harness assembly 32. The blower 12 generates a forced supply of air which is delivered to an outlet fitting 34. A discharge tube assembly at 36 communicates the propelled air from the outlet fitting 34 through a discharge opening 38 at the outlet end of the discharge tube assembly 36. With one arm 40, the operator 30 manipulates a control arm 42, and hand operated switches (not shown) thereon, to control the state of the blower 12. With the other arm 44, the operator 30 can grasp the discharge tube assembly 36 and direct the outcoming air to an appropriate location. It should be emphasized that the particular configuration of the blower 12 is not critical to the present invention.

The discharge tube assembly 36 consists of a first tubular element 46, as show also in FIG. 5. The first tubular element 46 has a cylindrical body 48 with a central axis 50. The first tubular element 46 has an inlet end 52, that is conventionally attached to the outlet fitting 34, and an outlet end 54, axially spaced from the inlet end 52.

Figure 7:
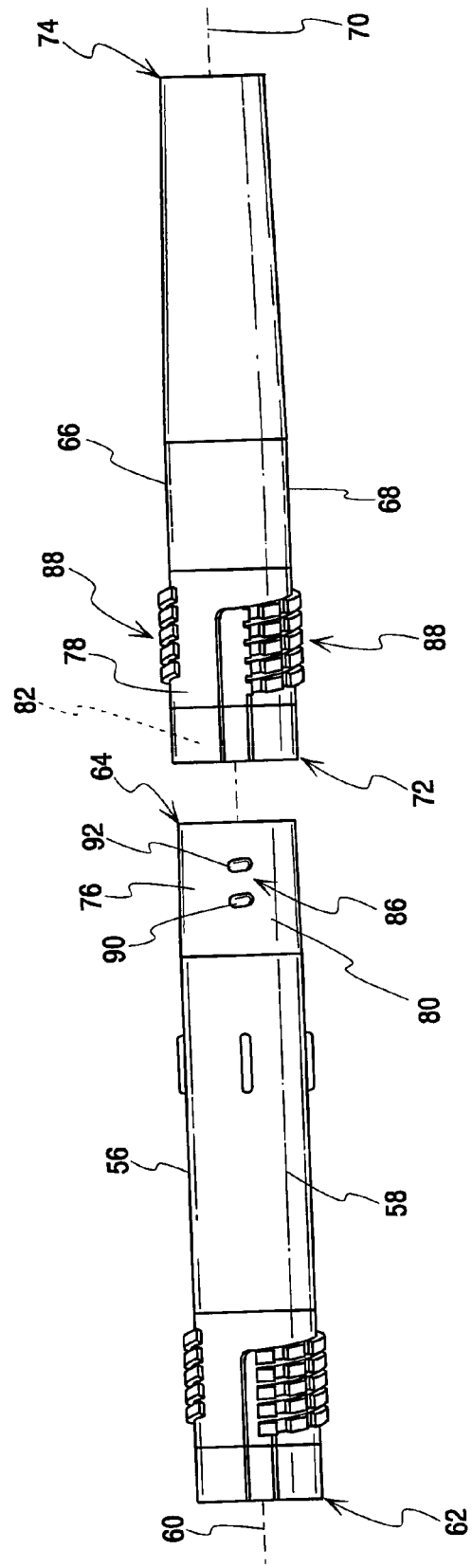
FIG. 7 is an exploded elevation view corresponding to that in FIG. 6.

The outlet end 54 of the first tubular element 46 is releasably connected to a second tubular element 56, as shown also in FIGS. 5-7. The second tubular element 56 has a cylindrical body 58 with a central axis 60. The outlet end 54 of the first tubular element 46 is connected to the inlet end 62 of the second tubular element 56. The second tubular element 56 has an outlet end 64 axially spaced from the inlet end 62.

The second tubular element 56 is in turn connected to a third tubular element/end fitting 66, as seen additionally in FIGS. 6 and 7. The third tubular element/end fitting 66 has a generally cylindrical body 68 with a central axis 70. The third tubular element/end fitting 66 has an inlet end 72 and an outlet end 74, spaced axially from the inlet end 72 and at which the discharge opening 38 is defined. The diameter of the body 68 tapers in diameter from a mid portion between the inlet and outlet ends 72, 74 towards the outlet end 74.

The invention can be utilized to releasably connect: a) the outlet end 54 of the first tubular element 46 to the inlet end 62 of the second tubular element 56; and b) the outlet end 64 of the second tubular element 56 to the inlet end 72 of the third tubular element/end fitting 66. While not shown as such, the inlet end 52 of the first tubular element 46 could be connected to the outlet fitting 34 utilizing the same inventive concept. Additional tubular elements (not shown) could be used to select the desired configuration of the discharge tube assembly 36 and connected using the inventive structure, as hereinbelow described. Since each of the aforementioned connections of the tubular elements 46, 56, 66 is made in the same manner, only the representative connection between the outlet end 64 of the second tubular element 56 and the inlet end 72 of the third tubular element/end fitting 66 will be described herein in detail. All of the other connections can be made in an identical or similar fashion. The details of this structure are shown in FIGS. 5-19.

The tubular element 56 has a male portion 76 that fits within a female portion 78 on the tubular element/end fitting 66. The male portion 76 has a radially outwardly facing surface 80, with the female portion 78 having a radially inwardly facing surface 82 which fully surrounds the radially outwardly facing surface 80 with the male and female portions 76, 78 operatively engaged, i.e. with the male portion 76 within the female portion 78, as shown in FIGS. 9-19. The tubular element 56 has a connecting assembly at 86, with the tubular element/end fitting 66 having a connecting assembly 88 that cooperates with the connecting assembly 86 to releasably maintain the tubular element 56 and tubular element/end fitting 66 in their operative relationship through a range of different relative positions, as hereinafter described.

Figure 8:
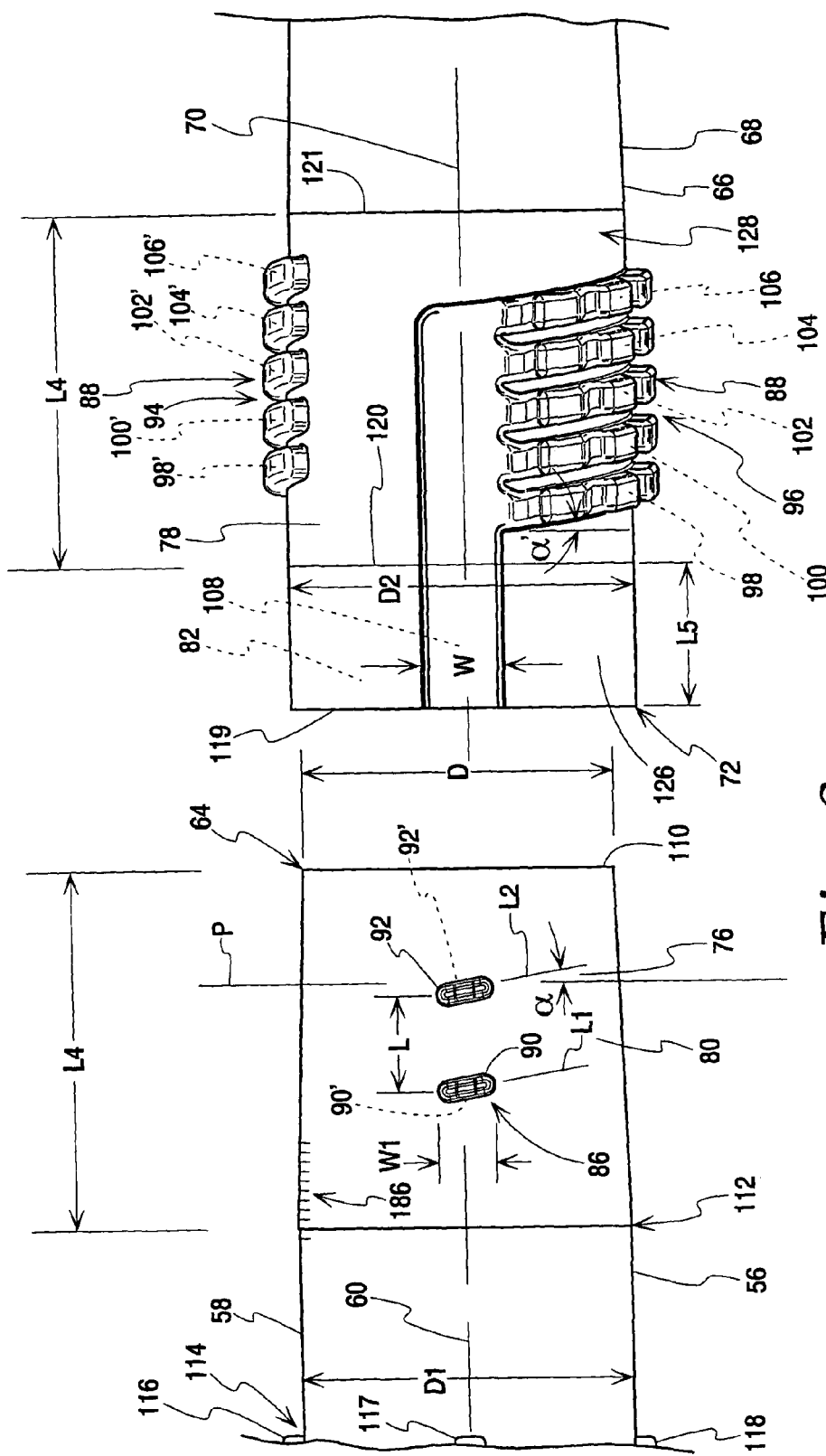
FIG. 8 is an enlarged, fragmentary, exploded, elevation view of male and female portions on the tubular elements in FIGS. 6 and 7, with the connecting assembly on the male portion including first and second radially outwardly extending projections and the connecting assembly on the female portion including a plurality of grooves to receive the projections.

The connecting assembly 86 consists of a pair of projections 90, 92 extending radially outwardly from the surface 80 at the same circumferential location. As seen in FIG. 8, the projections 90, 92 are spaced from each other an axial distance L. Each of the projections 90, 92 has an elongate shape, that is generally oval, with the lengths thereof, i.e. the lengths of the major axes, extending circumferentially along lines L1 and L2, respectively. The lines L1 and L2 are substantially parallel to each other and make an angle α with respect to a reference plane P which is orthogonal to the axis 60.

The connecting assembly 86 includes additionally projections 90', 92', which have an identical construction to the projections 90, 92. The pairs of projections 90, 92, and 90', 92' are located diametrically opposite to each other. The projections 90, 92 and 90', 92' coincide by visually rotating either pair of projections 90, 92 or 90', 92' through 180° around the axis 60.

The connecting assembly 88 consists of two sets of diametrically oppositely situated grooves at 94, 96. The set of grooves 96 is identical to the set of grooves 94, rotated through 180° around the axis 70. The description herein will be limited to the exemplary set of grooves at 96. The set of grooves 96 includes axially spaced, first, second, third, fourth, and fifth grooves 98, 100, 102, 104, 106, respectively, each formed radially outside of the radially inwardly facing surface 82. An axially extending entry groove 108 extends from the inlet end 72 so as to be contiguous with each of the grooves 98-106. The entry groove 108 has a circumferential extent/width W that is slightly greater than the effective circumferential width W1 for the projections 90, 92. The grooves 98-106 extend circumferentially on the order of 90-100° around the axis 70, with successive grooves spaced equidistantly from each other axially along the female portion 78. The spacing between the first and third grooves 98, 102, the second and fourth grooves 100, 104, and the third and fifth grooves 102, 106 is equal to the distance L, which represents the axial spacing between the projections 90, 92 and 90', 92'. The grooves 98-106 are inclined to have an axial rise angle/pitch α', equal to the angle α, which represents the inclination angle for the lengths of the projections 90, 92 relative to the reference plane P.

The connecting assemblies 86, 88 cooperate to controllably draw the tubular element 56 and tubular element/end fitting 66 axially towards each other to progressively increase the frictional holding force between the radially inwardly facing surface 82 on the female portion 78 and the radially outwardly facing surface 80 on the male portion 76. The radially outwardly facing surface 80 on the male portion 76 has a tapering diameter. More specifically, at the free end 110 at the outlet end 64 of the tubular element 56, the radially outwardly facing surface 80 has a diameter D which increases progressively axially to a location at 112. The tapering portion between the free edge 110 and the location 112 has an axial dimension L4. The radially outwardly facing surface on the tubular element 56 has a substantially uniform diameter D1 between the axial location 112 and a location at 114, at which there are axially extending user gripping protrusions 116, 117, 118, which each project radially outwardly sufficiently to be comfortably graspable by a user to facilitate imparting of a torque upon the body 58.

The tubular element/end fitting 66 has a uniform diameter D2, at least equal to, and preferably slightly greater than, D1, over an axial extent L5, extending from a free inlet end 119 of the tubular element/end fitting 66 to an axial location at 120. Between the axial location 120, and an axial location at 121, spaced therefrom by the axial distance L4, the diameter of the surface 82 of the tubular element/end fitting 66 tapers correspondingly to the surface 80 between the location 112 and the free edge 110 on the tubular element 56, so that the surfaces 80, 82 closely engage over the lengths L4 where the surfaces 80, 82 taper. Alternatively, the surface 82 can taper progressively from a diameter larger than D1 at the inlet end 72 to the axial location 121.

The diameters D, D2 are chosen so that the outlet end 64 of the tubular element 56 can be guidingly directed, without significant impedance, through the inlet end 72 of the tubular element/end fitting 66 to allow axial overlapping of the tapered surfaces 80, 82. The frictional holding force between the tubular element 56 and the tubular element/end fitting 66 is increased by forcing the tapering portions of the surfaces 80, 82 against each other. The axial penetration of the radially outwardly facing surface 80 is facilitated by making the thickness of the wall 126 on the body 68 non-uniform. More specifically, the wall thickness may decrease progressively from the free end 121 towards the axial region at 128 adjacent to the fifth groove 106, to permit the desired degree of penetration of the female portion 78 by the male portion 76 without excessive resistance. An exemplary range of wall thicknesses may be from 1.3-1.7 mm.

The cooperation between the connecting assemblies 86, 88 will now be described in greater detail. The explanation will be limited to the cooperation between the projections 90, 92 and the entry groove 108 and set of grooves at 96, with the understanding that the identical interaction occurs at a diametrically opposite location between the projections 90', 92' and the set of grooves at 94. Additionally, the interaction of each of the projections 90, 92 with each of the grooves 98-106 is the same, with the description herein limited to the interaction between one of the projections 90 and one of the grooves 98-106.

The tubular element 56 and tubular element/end fitting 66 are concentrically aligned in a preassembly state, as shown in FIG. 8. The relative rotational position of the tubular element 56 and tubular element 66/end fitting 66 can be controlled so that the leading projection 92 is circumferentially registered with the entry groove 108. Alternatively, and more preferably, the outlet end 64 of the second tubular element 56 can be directed loosely into the female portion 78 until the projection 92 resides against the free end 121. The user can then slightly relatively rotate the tubular element 56 and tubular element/end fitting 66 to sense when the projection 92 registers with the entry groove 108. Once this occurs, the tubular element 56 and tubular element/end fitting 66 can be moved axially towards each other to the point that the male portion 76 is snugly fit in the female portion 78. This may occur with the projections 90, 92 axially aligned with either the first and third grooves 98, 102, the second and fourth grooves 100, 104, or the third and fifth grooves 102, 106. At this point, the tubular element 56 and tubular element/end fitting 66 are in a first relative rotational position, as shown in FIGS. 12-15, with the projections 90, 92 aligned axially with a like number of grooves 98-106. It should be noted that in FIGS. 15-19, the radially inwardly and outwardly facing surfaces 80, 82 are shown in radially spaced relationship for purposes of clarity. These surfaces 80, 82 may actually be in closer proximity or against each other with the tubular element 56 and tubular element/end fitting 66 operatively engaged.

The grooves 98-106 have enlarged entryways 130, 132, 134, 136, 138, respectively, which guide movement of the projections 90, 92 into the appropriate grooves 98-106. The tapered configuration of the entryways 130, 132, 134, 136, 138 produces an adjusting camming action between the projections 90, 92 and the converging surfaces defining the entryways 130, 132, 134, 136, 138 that effects a modicum of relative axial movement between the tubular element 56 and tubular element/end fitting 66 to cause consistent centered alignment to be achieved between the projections 90, 92 and grooves 98, 100, 102, 104. With the tubular element 56 and tubular element/end fitting 66 in a first relative rotational position, shown in FIGS. 8 and 12-15, and a first relative axial position, as shown in FIGS. 9 and 14, the projection 90 aligns with the first groove 98, with the projection 92 aligning with the third groove 102. Starting from this state, the sequence of adjusting steps will be described with respect to FIGS. 15-19. It should be noted that each projection 90, 92, 90', 92' cooperates in the same manner with each groove 98, 100, 102, 104, 106 in the set 96 and each groove 98', 100', 102', 104', 106' in the set 94.

Figure 15:
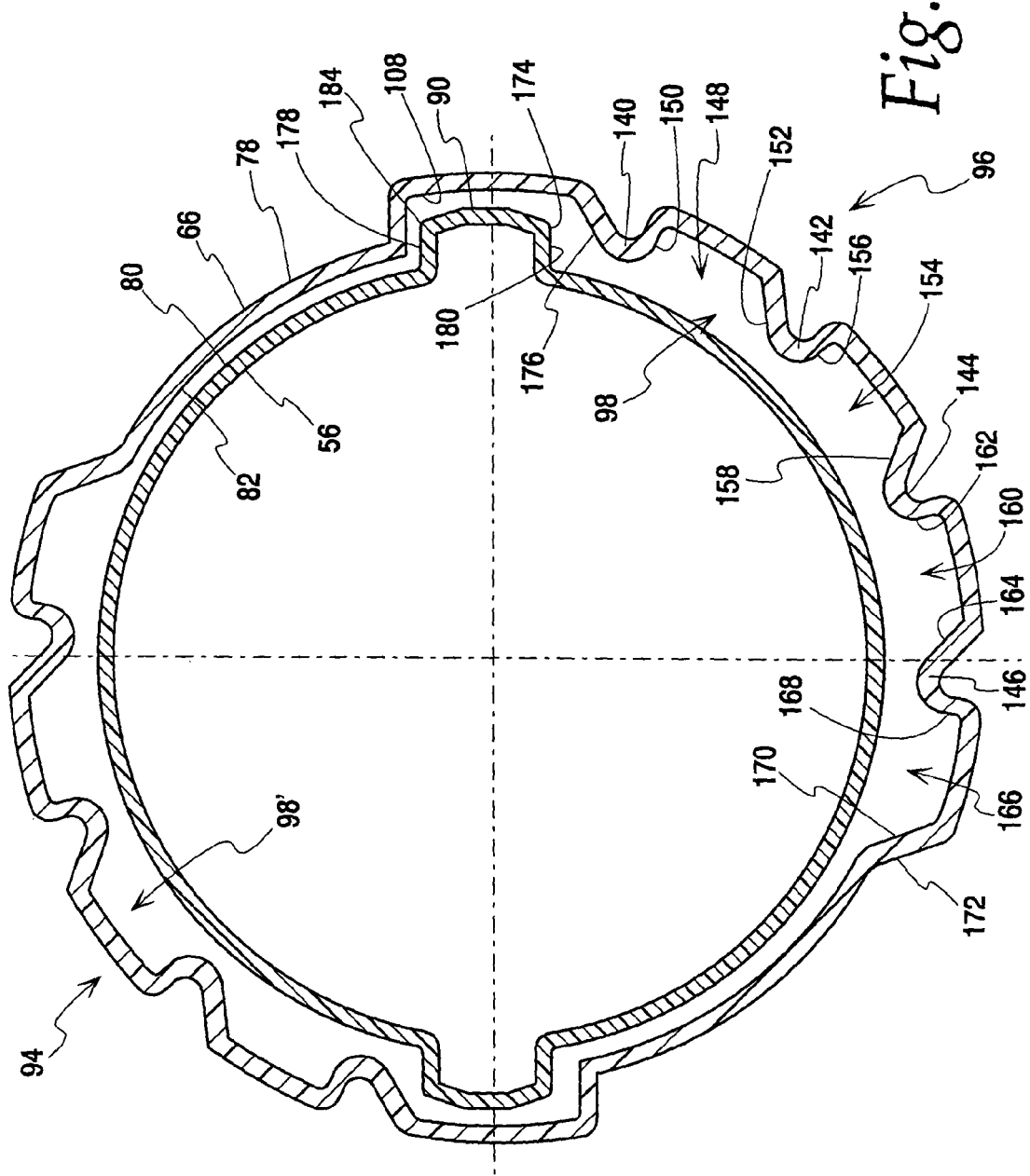
FIG. 15 is an enlarged cross-sectional view of the tubular elements in FIGS. 6-12 operatively engaged and showing one of the projections in a representative groove with the tubular elements in any of the three relative axial positions depicted in FIGS. 9-11 and in the first relative rotational position.

As seen in FIG. 15, the female portion 78 has a plurality, and in this case four, radially inwardly extending projections 140, 142, 144, 146 which extend into the groove 98. A first receptacle 148 is defined between circumferentially oppositely facing surfaces 150, 152 on the adjacent projections 140, 142. A second receptacle 154 is bounded by circumferentially oppositely facing surfaces 156, 158 on the projections adjacent 142, 144, respectively. A third receptacle 160 is bounded by circumferentially oppositely facing surfaces 162, 164 on the adjacent projections 144, 146. A fourth receptacle 166 is bounded by circumferentially oppositely facing surfaces 168, 170, with the former on the projection 146 and the latter on a groove end wall 172.

Figure 16:
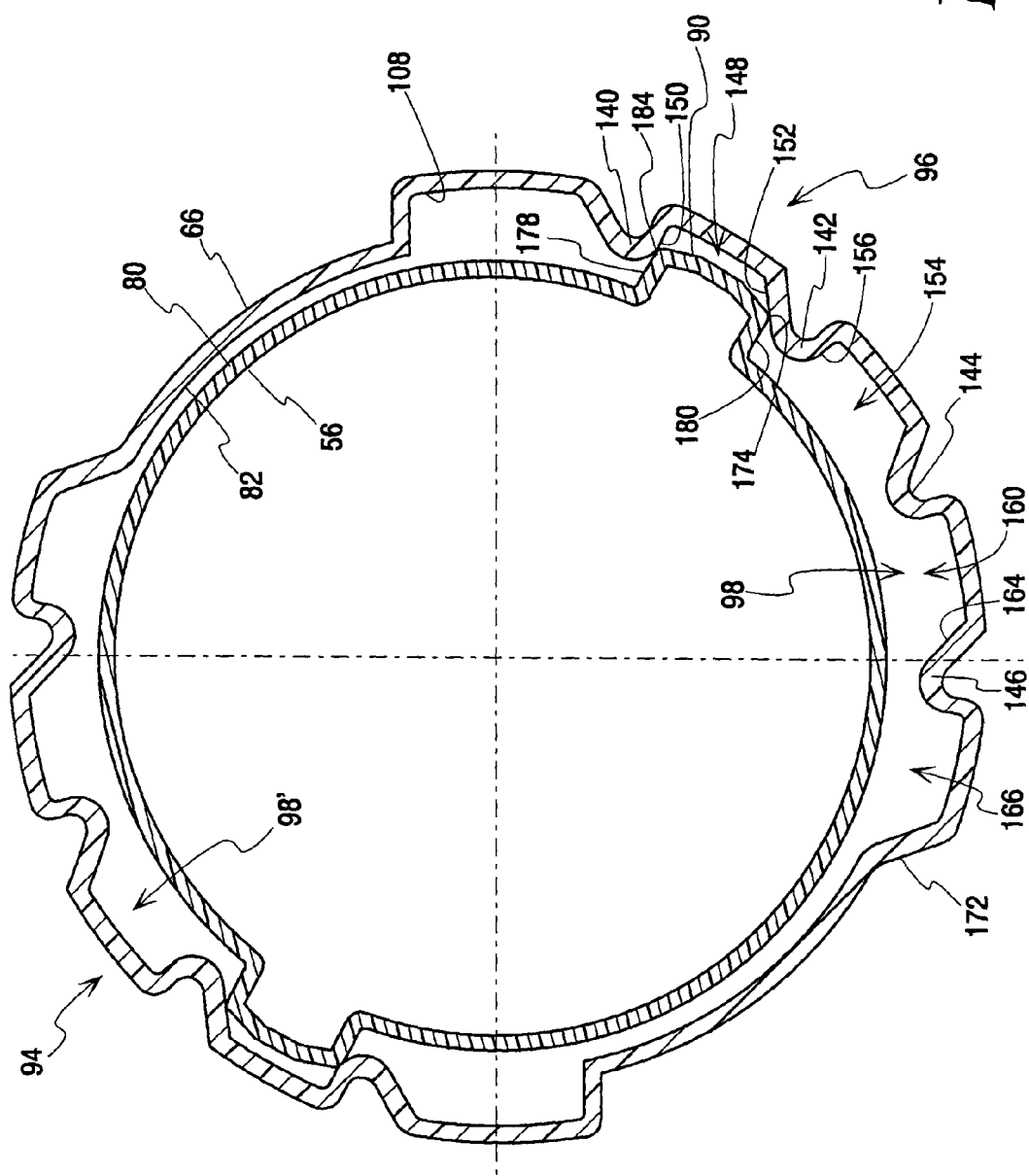
FIG. 16 corresponds to FIG. 15 with the tubular elements moved to a second relative rotational position.

As the tubular element 56 and tubular element/end fitting 66 are relatively rotated, as by clockwise movement in FIG. 15 of the tubular element 56 and/or counterclockwise movement of the tubular element/end fitting 66, the projection 90 is driven against the projection 140. More specifically, a camming corner 174 on the projection 90 advances against an angled surface 176 on the projection 140 to wedge the projection 140 radially outwardly and/or the projection 90 radially inwardly. Deformation of one or both of the projections 90, 140 is sufficient to allow the projection 90 to move circumferentially past the projection 140 and into the receptacle 148 with the tubular element 56 and tubular element/end fitting 66 in a second relative rotational position, as shown in FIG. 16.

Figure 17:
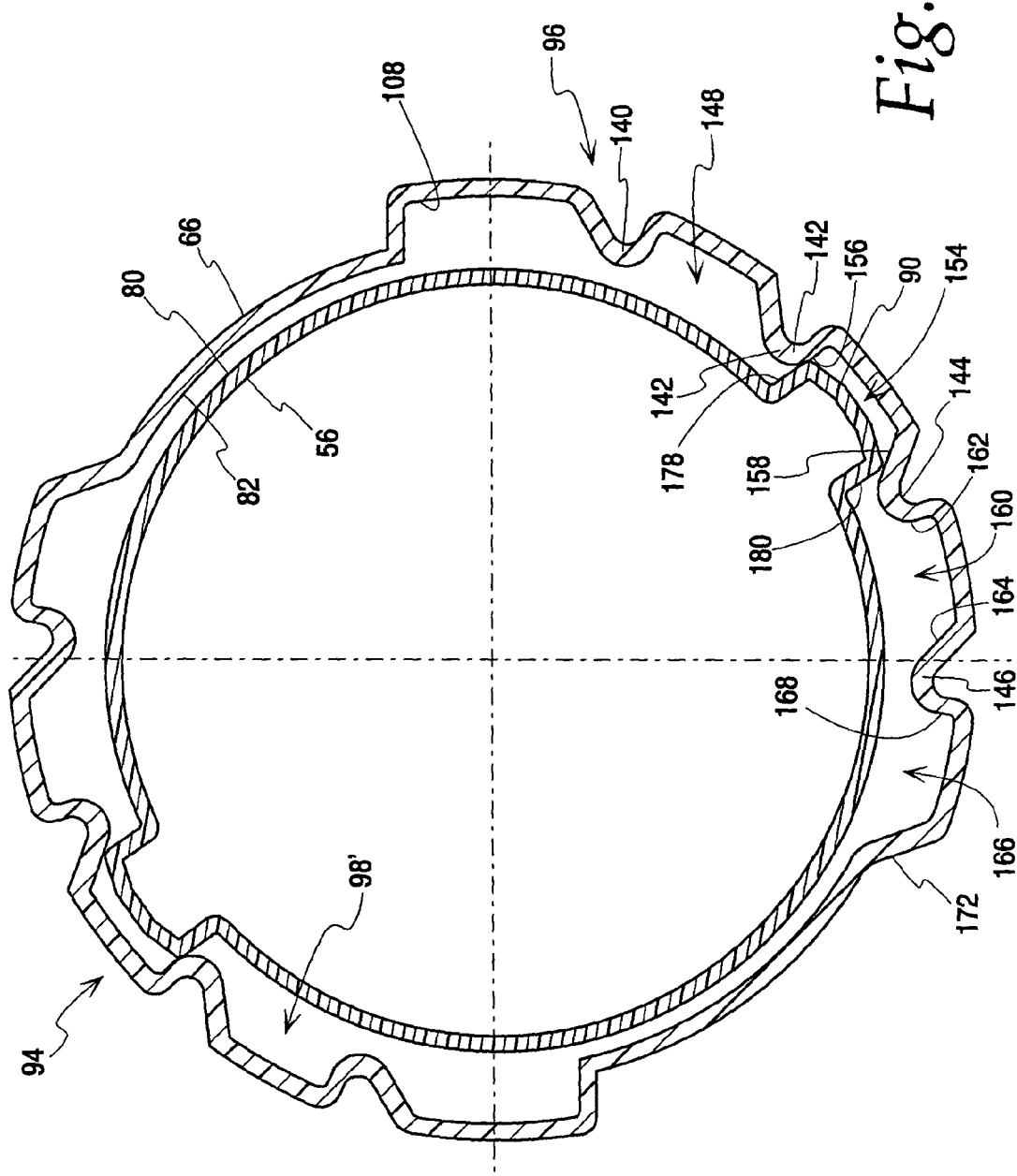
FIG. 17 corresponds to FIG. 15 with the tubular elements moved to a third relative rotational position.
Figure 18:
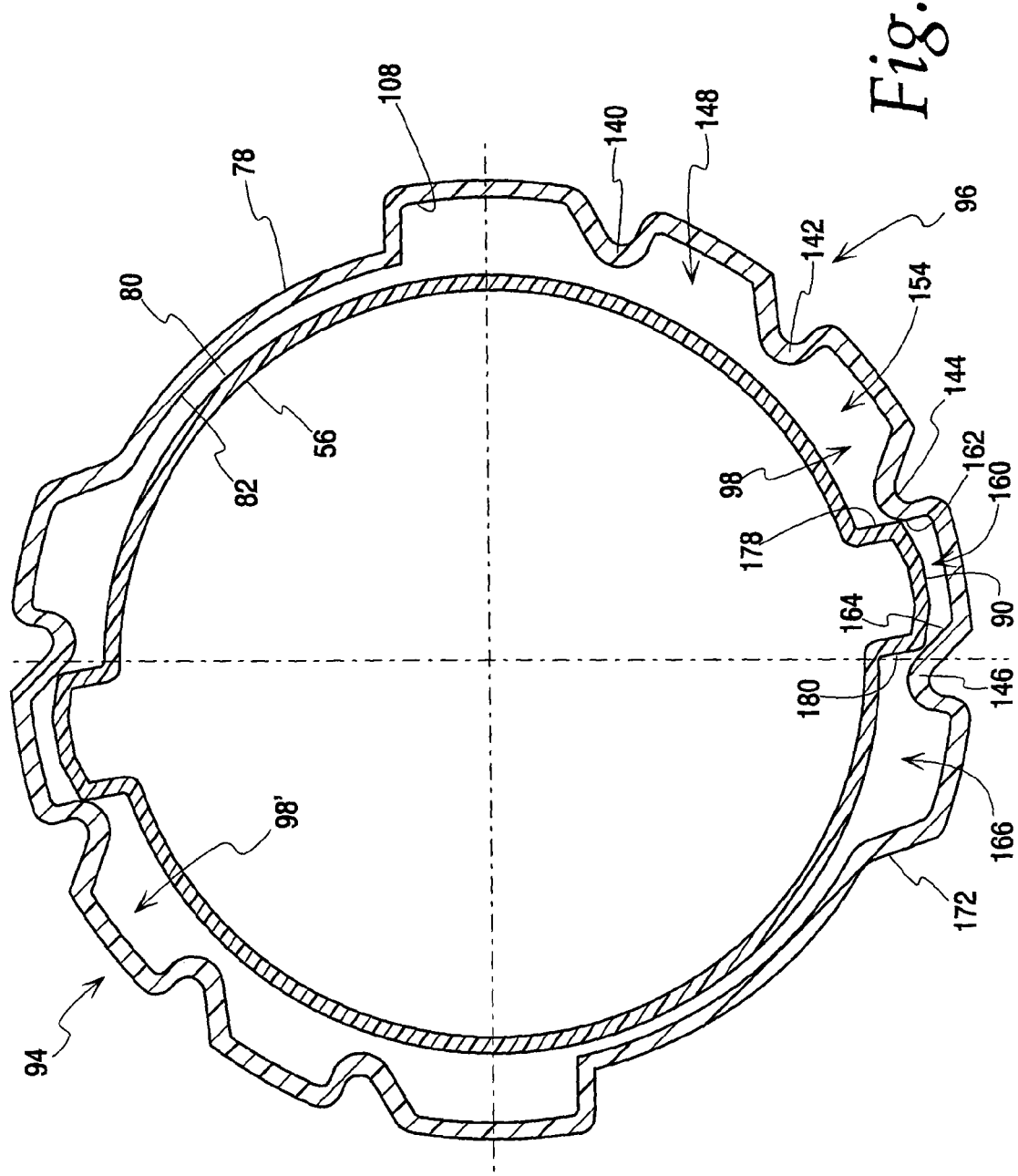
FIG. 18 corresponds to FIG. 15 with the tubular elements moved to a fourth relative rotational position.
Figure 19:
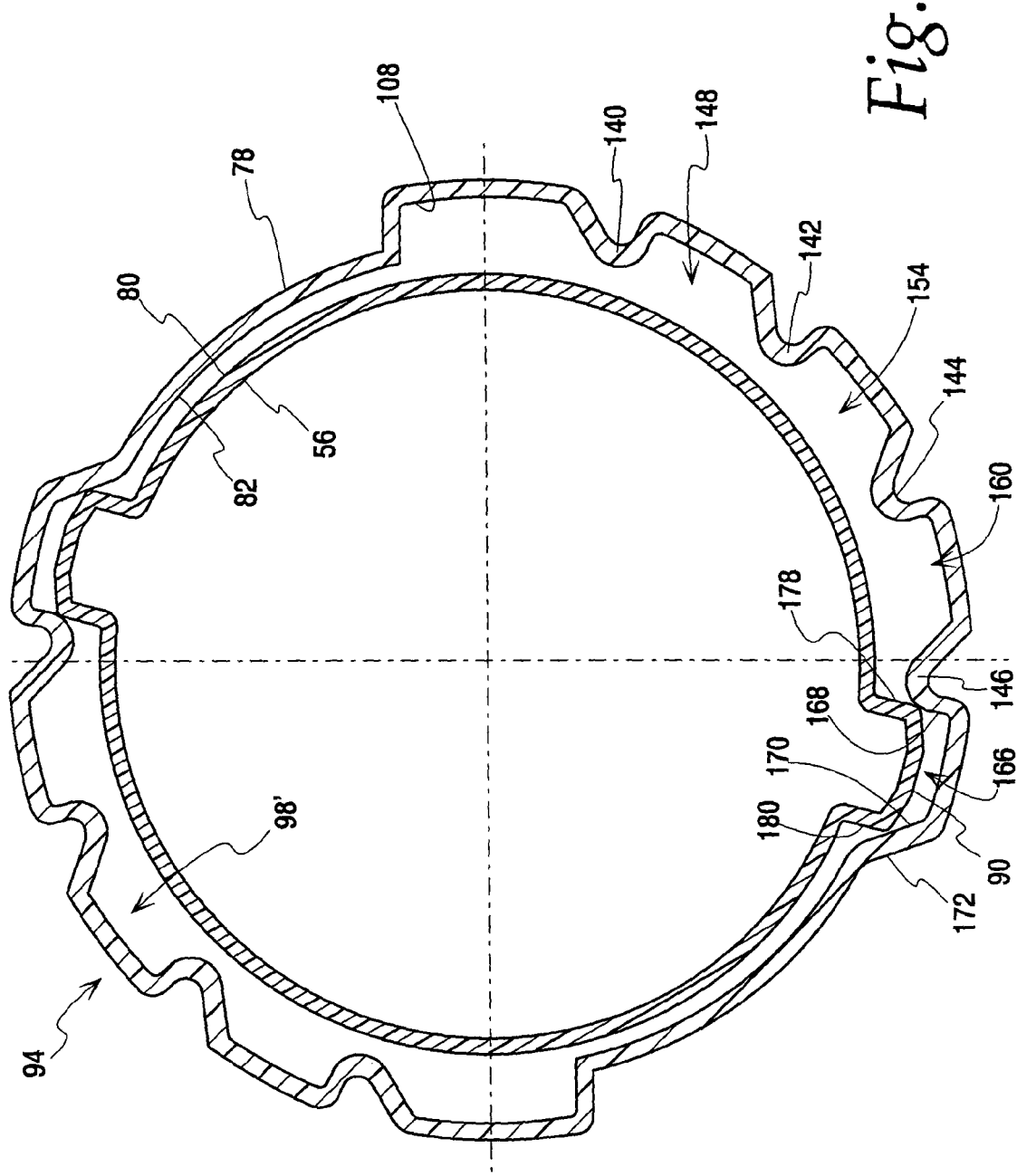
FIG. 19 corresponds to FIG. 15 with the tubular elements moved to a fifth relative rotational position.

With the projection 90 in the first receptacle 148, the surfaces 150, 152 on the projections 140, 142 respectively confront circumferentially oppositely facing surfaces 178, 180 on the projection 90 to confine the projection 90 within the receptacle 148, preferably thereby permitting only a modicum of circumferential movement in either direction. A greater degree of circumferential movement of the projection 90 within the first receptacle 148 may be permitted, however, this might allow unwanted play in the connection between the tubular element 56 and the tubular element/end fitting 66. Since the projections 140, 142, 144, 146 have the same general configuration, the projection 90 can be moved serially into the receptacles 154, 160, 166 to achieve third, fourth and fifth relative rotational positions, between the tubular element 56 and tubular element/end fitting 66, as shown in FIGS. 17-19, respectively. This construction produces a detent-type mechanism wherein the user can sense the transition of the projection 90 from the entry groove 108 into each of the receptacles 148, 154, 160, 166.

Because the groove 98 is configured with an axial rise angle α' equal to the angle α at which the length of the projection 90 extends relative to the reference plane P, as the projection 90 moves in the groove 98, the tubular element 56 and tubular element/end fitting 66 cooperate to become progressively cammed axially towards each other to increase the frictional holding force between the tubular element 56 and tubular element/end fitting 66. The user can relatively rotate the tubular element 56 and tubular element/end fitting 66 to an extent to situate the projection 90 in the particular receptacle 148, 154, 160, 166 that produces the desired frictional holding force. In the event that the holding force is not determined to be adequate with the projection 90 in the receptacle 166, the user can back the projection 90 out of the groove 98 and into the groove 108 to place the tubular element 56 and tubular element/end fitting 66 in a different relative axial position, as hereinafter explained. As the projection 90 is backed out, a separate camming corner 184 on the projection 90 consecutively engages the projections 146, 144, 142, 140. By this interaction, the projection 90 is deformed radially inwardly and/or the projections 146, 144, 142, 140 are deformed radially outwardly to allow passage of the projection 90 from a position within the recess 166 back into the entry groove 108.

Figure 13:
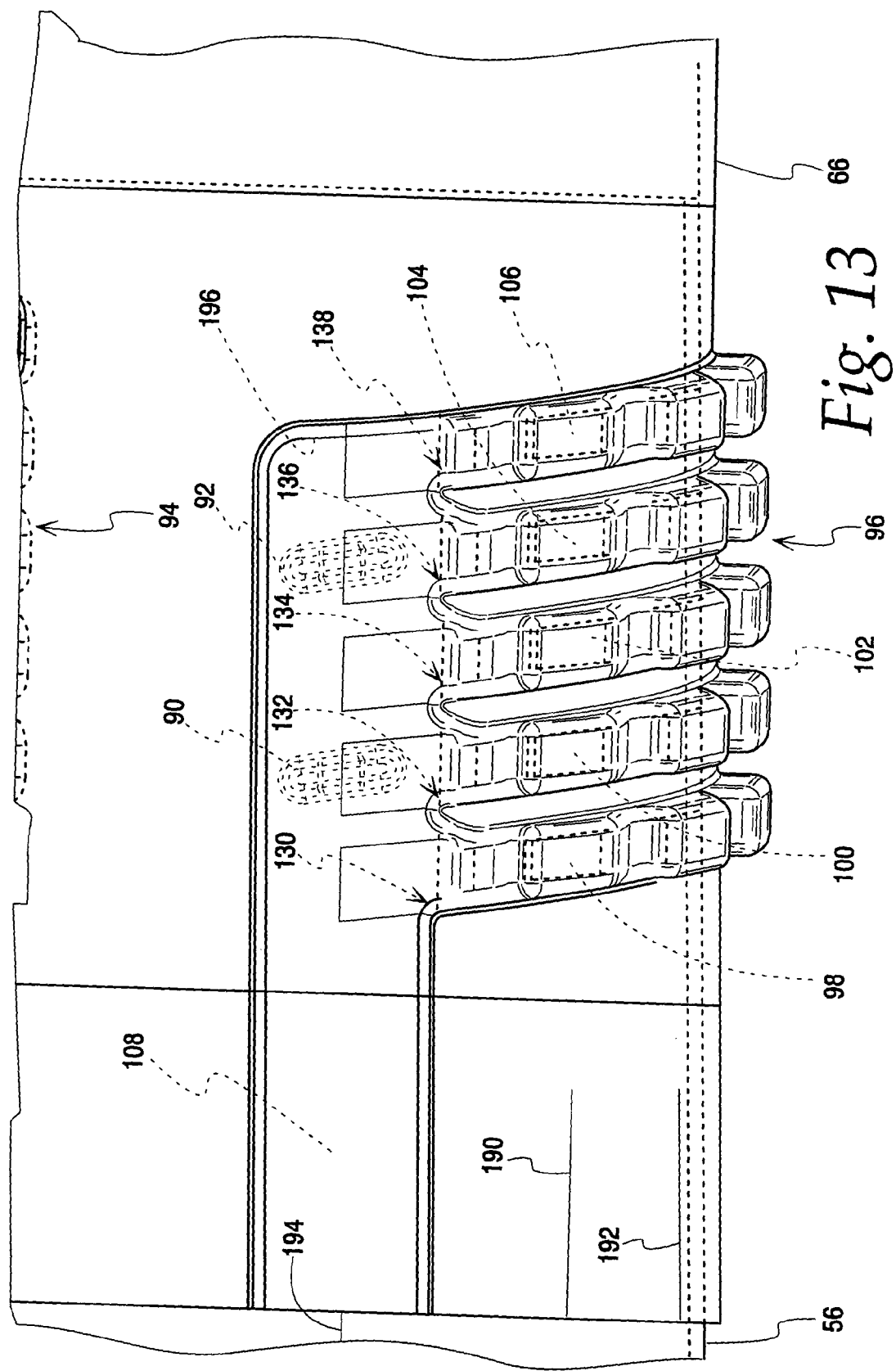
FIG. 13 is a view as in FIG. 12 and corresponding to the view in FIG. 10.
Figure 14:
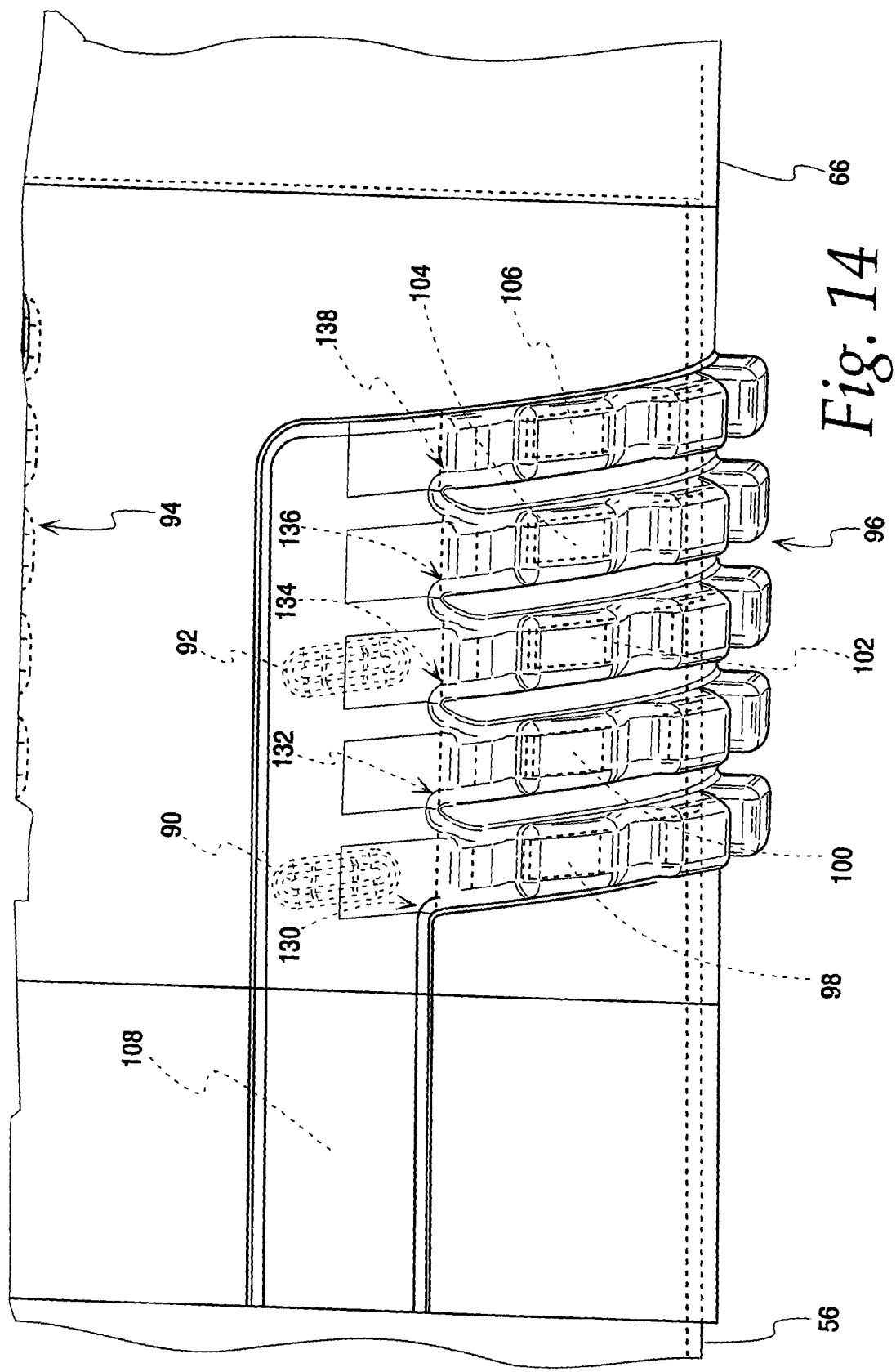
FIG. 14 is a view as in FIGS. 12 and 13 and corresponding to the view in FIG. 9.

The user can then place the tubular element 56 and tubular element/end fitting 66 in a second relative axial position, show in FIGS. 10 and 13, wherein the projection 90 axially aligns with the entryway 132 to the second groove 100 and the projection 92 axially aligns with the entryway 136 to the fourth groove 104. By changing the tubular element 56 and tubular element/end fitting 66 from the first relative axial position to the second relative axial position, the starting frictional holding force therebetween is increased. The tubular element 56 and tubular element/end fitting 66 can then be relatively rotated, as shown sequentially in FIGS. 15-19, to progressively increase the frictional holding force between the tubular element 56 and tubular element/end fitting 66. If reconfiguration to the relative rotational position shown in FIG. 19 does not produce the desired frictional holding force, the projection 90 can be resituated back into the entry groove 108 after which the tubular element 56 and tubular element/end fitting 66 can be placed in a third relative axial position, as shown in FIGS. 11 and 12, wherein the projection 90 aligns with the third groove 102 and the projection 92 aligns with the fifth 106, after which the aforementioned steps can be reperformed to change the relative rotational positions between the tubular element 56 and tubular element/end fitting 66.

With this arrangement a desired frictional holding force can be closely arrived at through feel by initially translating the tubular element 56 and tubular element/end fitting 66 towards each other with the tubular element 56 and tubular element/end fitting 66 in the first relative rotational position wherein the projections 90, 92 reside in the entry groove 108. This initial step produces a relatively snug connection between the tubular element 56 and tubular element/end fitting 66. Thereafter, the tubular element 56 and tubular element/end fitting 66 can be relatively rotated to further increase the frictional holding force between these elements. The user can sense the different relative rotational positions between the tubular element 56 and tubular element/end fitting 66, which positions are releasably maintained. In effect, a ratchet-type action is produced as the adjustments are made.

In a preferred form, the axial positions of the grooves 98-106 are set so that the maximum frictional holding force that can be generated with the tubular element 56 and tubular element/end fitting 66 in the first relative axial position and moved to the fifth relative rotational position is slightly less than that which results with the tubular element 56 and tubular element/end fitting 66 in the second relative axial position of FIG. 10 with the tubular element 56 and tubular element/end fitting 66 in the first relative rotational position. Accordingly, a smooth transition of frictional holding force can be set through the entire permissible range. However, this particular feature is not required.

By reason of permitting a range of frictional holding forces between the tubular element 56 and tubular element/end fitting 66, manufacturing tolerances may not have to be as closely maintained. This potentially permits blow molding manufacture of parts that might otherwise require a more expensive injection molding process.

Further, as parts change in configuration, as by frictional wear, this variation can be accommodated by controllably adjusting the frictional holding force within the aforementioned range.

The inventive concept can be used with virtually any connection between telescopingly engaged parts. For example, as previously noted, while the inlet end 52 of the first tubular element 46 is connected to a fitting on the blower 12 having a conventional construction, the inventive concept can be used at this location as well.

The inventive structure lends itself to manufacture using a number of different moldable plastic or non-plastic materials well known to those skilled in this art.

While the preferred embodiment utilizes multiple projections 90, 92, 90', 92' at each of two diametrically opposite locations, at either of the diametrically opposite locations, a single projection 90, 92, 90', 92' would function consistently with the invention. Still further, while cooperating projections 90, 92, 90', 92' and sets of grooves 94, 96 are shown at diametrically opposite locations, a single projection 90, 92, 90', 92' capable of cooperating with a single set of grooves 94, 96 is contemplated by the invention. The multiple projections 90, 92, 90', 92' at each diametrically opposite location and the provision of cooperating projections 90, 92, 90', 92' and sets of grooves 94, 96 at separate circumferential locations is preferred in that this arrangement generally provides more positive interaction of the tubular element 56 and tubular element/end fitting 66 and potentially affords greater overall stability and strength to the joined tubular element 56 and tubular element/end fitting 66.

Other variations are contemplated. For example, the elongate, oval configuration of the projections 90, 92, 90', 92' is only exemplary and preferred because of the substantial guide surface area that this configuration affords. However, the projections could take virtually any projecting form, such as circular, triangular, square, etc.

The exact number of grooves 98, 100, 102, 104, 106 is a design consideration and could range from as few as one to any number greater than the five shown.

Further, some indicia, as shown at 186 in FIG. 8, or stop structure might be provided to allow the user to consistently visually or tactilely sense positioning of the tubular element 56 and tubular element/end fitting 66 in the different relative axial positions. Further, as shown in FIG. 13, indicia 190, 192 (two of four shown) may be provided on the tubular element/end fitting 66 at circumferentially spaced locations coinciding, one each, with the circumferential locations of the receptacles 148, 154, 160, 166. A mark 194 on the tubular element 56 coincides circumferentially with the projections 190, 192 and is aligned with the receptacle 148, 154, 160, 166 in which the projections 190, 192 are currently releasably held. This allows the user to visually identify the current relative rotational position of the tubular element 56 and the tubular element/end fitting 66 and facilitates selective repositioning of the same by relative rotation.

The limitation of penetration of the tubular element/end fitting 66 by the tubular element 56 is determined by the projections 92, 92' which abut shoulders 196 (one shown in FIG. 13) at the ends of the entry grooves 108, 108'.

Further, any of the tubular elements can be made in multiple pieces. For example, a tubular element may have one part relative to which a portion having the connecting assembly thereon is relatively movable, as by rotation. For purposes of the description and the claims herein, the single and multipart constructions are treated equivalently as if one part.

The foregoing disclosure of specific embodiments is intended to be illustrative of the broad concepts comprehended by the invention.

The invention claimed is:

1. In combination:

a fluid blower;

a first tubular element having a first axis, a first portion with a radially outwardly facing surface and a first connecting assembly with a first circumferentially facing surface; and a second tubular element having a second portion with a second axis, a radially inwardly facing surface, and a second connecting assembly with a second circumferentially facing surface, the first and second tubular elements made from a moldable, non-metallic material, the first portion extendable within the second portion so that the radially inwardly facing surface on the second tubular element surrounds the radially outwardly facing surface on the first tubular element and the radially inwardly and outwardly facing surfaces engage to produce a frictional holding force between the first and second tubular elements, the first and second tubular elements positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other, the first and second connecting assemblies cooperating so that the first and second circumferentially facing surfaces confront each other with the first and second tubular elements in the second relative rotational position to thereby block relative movement of the first and second tubular elements from the second relative rotational position back into the first relative rotational position, one of the first and second portions having a third circumferentially facing surface that confronts one of a) one of the first and second circumferentially facing surfaces on the other of the first and second portions and b) a fourth circumferentially facing surface on the other of the first and second portions, with the first and second tubular elements relatively moved around the first and second axes from the first relative rotational position past the second relative rotational position into a third relative rotational position to thereby block relative movement of the first and second tubular elements from the third relative rotational position back into the second relative rotational position, the first and second tubular elements connected to the fluid blower so that fluid propelled by the fluid blower is directed through the first and second tubular elements, wherein the first portion has a first radially outwardly extending projection and the second portion has a first groove in which the first projection guidingly moves as the first and second tubular elements are changed between the first and second relative rotational positions, wherein the first radially outwardly extending projection defines the first circumferentially facing surface and the second circumferentially facing surface resides in a path traveled by the first radially outwardly extending projection as the first and second tubular elements are changed between the first and second relative rotational positions, wherein the first and second tubular elements are positionable in a second relative axial position wherein relative movement of the first and second tubular elements from the first relative rotational position into the second relative rotational position causes the first and second connecting assemblies to draw the first and second portions axially towards each other further than with the first and second tubular elements in the first relative axial position and the first and second tubular elements moved from the first relative rotational position into the second relative rotational position so that the frictional holding force between the first and second tubular elements with the first and second tubular elements in the second relative axial position and changed from the first relative rotational position into the second relative rotational position is greater than the frictional holding force between the first and second tubular elements with the first and second tubular elements in the first relative axial position and changed from the first relative rotational position into the second relative rotational position, the first and second tubular elements movable between the first and second relative axial positions without requiring relative rotational movement between the first and second tubular elements around the first and second axes.

2. The combination according to claim 1 wherein the first portion has a second radially outwardly extending projection and the second portion has a second groove in which the second radially outwardly extending projection guidingly moves as the first and second tubular elements are changed between the first and second relative rotational positions.

3. The combination according to claim 2 wherein the first and second radially outwardly extending projections are at substantially diametrically opposite locations on the first portion.

4. The combination according to claim 2 wherein the first and second radially outwardly extending projections are at substantially the same circumferential location on the first portion.

5. The combination according to claim 1 wherein the first radially outwardly extending projection has an elongate shape with a length.

6. The combination according to claim 1 wherein the first groove has a first axial rise and the second groove has a second axial rise and the first and second axial rises are approximately equal.

7. The combination according to claim 1 wherein the second tubular element has an axially extending entry groove which is contiguous with the first and second grooves.

8. The combination according to claim 1 wherein the first and second portions comprise a flexible plastic material.

9. The combination according to claim 1 wherein one of the first and second tubular elements has a fitting for connection directly to the fluid blower.

10. The combination according to claim 9 wherein the fluid blower is a portable blower for propelling air.

11. In combination:
a fluid blower;
a first tubular element having a first axis, a first portion with a radially outwardly facing surface and a first connecting assembly with a first circumferentially facing surface; and
a second tubular element having a second portion with a second axis, a radially inwardly facing surface, and a second connecting assembly with a second circumferentially facing surface,
the first portion extendable within the second portion so that the radially inwardly facing surface on the second tubular element surrounds the radially outwardly facing surface on the first tubular element,
the first and second tubular elements positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other,
the first and second connecting assemblies cooperating so that the first and second circumferentially facing surfaces confront each other with the first and second tubular elements in the second relative rotational position to thereby block relative movement of the first and second tubular elements from the second relative rotational position back into the first relative rotational position,
one of the first and second portions having a third circumferentially facing surface that confronts one of a) one of the first and second circumferentially facing surfaces on the other of the first and second portions and b) a fourth circumferentially facing surface on the other of the first and second portions, with the first and second tubular elements relatively moved around the first and second axis from the first relative rotational position past the second relative rotational position into a third relative rotational position to thereby block relative movement of the first and second tubular elements from the third relative rotational position back into the second relative rotational position, the first and second tubular elements connected to the fluid blower so that fluid propelled by the fluid blower is directed through the first and second tubular elements, wherein the first portion has a first radially outwardly extending projection and the second portion has a first groove in which the first projection guidingly moves as the first and second tubular elements are changed between the first and second relative rotational positions, wherein the second portion has a first radially inwardly extending projection which extends into the first groove and as the first and second tubular elements are changed from the first relative rotational position into the second relative rotational position the first radially outwardly extending projection and first radially inwardly extending projection interact so that at least one of a) the first radially outwardly extending projection deforms radially inwardly and b) the first radially inwardly extending projection deforms radially outwardly to allow the first radially outwardly extending projection and first radially inwardly extending projection to move past each other in a circumferential direction to thereby allow the first and second circumferential facing surfaces to confront each other.

12. In combination:

a first tubular element having a first axis, a first portion with a radially outwardly facing surface and a first connecting assembly with a first circumferentially facing surface; and a second tubular element having a second portion with a second axis, a radially inwardly facing surface, and a second connecting assembly with a second circumferentially facing surface, the first portion extendable within the second portion so that the radially inwardly facing surface on the second tubular element surrounds the radially outwardly facing surface on the first tubular element, the first and second tubular elements positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other, the first and second connecting assemblies cooperating so that the first and second circumferentially facing surfaces confront each other with the first and second tubular elements in the second relative rotational position to thereby block relative movement of the first and second tubular elements from the second relative rotational position back into the first relative rotational position, wherein the first portion has a first radially outwardly extending projection and the second portion has a first groove in which the first projection guidingly moves as the first and second tubular elements are changed between the first and second relative rotational positions, wherein the second portion has a first radially inwardly extending projection which extends into the first groove and as the first and second tubular elements are changed from the first relative rotational position into the second relative rotational position the first radially outwardly extending projection and first radially inwardly extending projection interact so that at least one of a) the first radially outwardly extending projection deforms radially inwardly and b) the first radially inwardly extending projection deforms radially outwardly to allow the first radially outwardly extending projection and first radially inwardly extending projection to move past each other in a circumferential direction to thereby allow the first and second circumferential facing surfaces to confront each other, wherein the second portion has a second radially inwardly extending projection which extends into the first groove and defines a third circumferentially facing surface facing in the same circumferential direction as the second circumferentially facing surface, the first and second tubular elements repositionable from the first relative rotational position past the second relative rotational position to a third relative rotational position wherein the first and third circumferentially facing surfaces confront each other to thereby block relative movement of the first and second tubular elements from the third relative rotational position back into the second relative rotational position, the first and second connecting assemblies cooperating to draw the first and second portions axially towards each other further with the first and second tubular elements in the third relative rotational position than with the first and second tubular elements in the second relative rotational position.

13. The combination according to claim 12 wherein the first and second radially inwardly extending projections define a first receptacle therebetween in which the first radially outwardly extending projection extends with the first and second tubular elements in the second relative rotational position, the first receptacle dimensioned so that the first radially outwardly extending projection is substantially blocked against movement in opposite circumferential directions within the first groove.

14. The combination according to claim 12 wherein the second tubular element has an axially extending entry groove which is contiguous with the first groove.

15. In combination:

a fluid blower;

a first tubular element having a first axis, a first portion with a radially outwardly facing surface and a first connecting assembly with a first circumferentially facing surface; and a second tubular element having a second portion with a second axis, a radially inwardly facing surface, and a second connecting assembly with a second circumferentially facing surface, the first portion extendable within the second portion so that the radially inwardly facing surface on the second tubular element surrounds the radially outwardly facing surface on the first tubular element, the first and second tubular elements positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other, the first and second connecting assemblies cooperating so that the first and second circumferentially facing surfaces confront each other with the first and second tubular elements in the second relative rotational position to thereby block relative movement of the first and second tubular elements from the second relative rotational position back into the first relative rotational position,
one of the first and second portions having a third circumferentially facing surface that confronts one of a) one of the first and second circumferentially facing surfaces on the other of the first and second portions and b) a fourth circumferentially facing surface on the other of the first and second portions, with the first and second tubular elements relatively moved around the first and second axis from the first relative rotational position past the second relative rotational position into a third relative rotational position to thereby block relative movement of the first and second tubular elements from the third relative rotational position back into the second relative rotational position,
the first and second tubular elements connected to the fluid blower so that fluid propelled by the fluid blower is directed through the first and second tubular elements,
wherein the radially outwardly facing surfaces on the first tubular element and radially inwardly facing surface on the second tubular element are relatively dimensioned so that the radially outwardly facing surface and radially inwardly facing surface are urged against each other with a frictional force that is greater with the first and second tubular elements in the second relative rotational position than with the first and second tubular elements in the first relative rotational position.

16. A method of joining first and second tubular elements, said method comprising the steps of:
providing a first tubular element having a first axis, a first portion with a radially outwardly facing surface and a first connecting assembly;
providing a second tubular element having a second axis, a second portion with a radially inwardly facing surface, and a second connecting assembly;
aligning the first and second tubular elements in a preassembly state with the first and second axes substantially coincident and the first portion adjacent to the second portion;
relatively axially moving the first and second tubular elements from the preassembly state towards each other into a first relative axial position;
with the first and second tubular elements in the first relative axial position, relatively moving the first and second tubular elements around the first and second axes from a first relative rotational position into a second relative rotational position, and thereby causing the first and second connecting assemblies to cooperate so as to draw the first and second portions axially towards each other wherein the first and second tubular elements are in a second relative axial position,
wherein at least one of the radially inwardly and outwardly facing surfaces is tapered so that by reason of the tapering a frictional force generated between the radially inwardly and outwardly facing surfaces on the first and second portions is caused to be greater with the first and second tubular elements in the second relative axial position than with the first and second tubular elements in the first relative axial position,
wherein the step of causing the first and second connecting assemblies to cooperate comprises causing the first and second connecting assemblies to cooperate to releasably block the first and second tubular elements in the second relative rotational position;
relatively axially moving the first and second tubular elements from the preassembly state towards each other into a third relative axial position that is different than the first relative axial position; and
with the first and second tubular elements in the third relative axial position, relatively rotating the first and second tubular elements into a third relative rotational position wherein a frictional force generated between the radially inwardly and outwardly facing surfaces is different than a frictional force generated between the radially inwardly and outwardly facing surfaces resulting from the tubular elements changing from the first relative axial position and first relative rotational position into the second relative rotational position.

17. The method of joining first and second tubular elements according to claim 16 wherein the step of causing the first and second connecting assemblies to cooperate comprises causing a projection on one of the first and second connecting assemblies to move in a groove with an axial rise on the other of the first and second connecting assemblies as an incident of the first and second tubular elements being relatively rotated.

18. The method of joining first and second tubular elements according to claim 16 wherein the step of causing the first and second connecting assemblies to cooperate comprises causing a plurality of axially spaced projections to interact one each with a plurality of grooves each with an axial rise.

19. The method of joining first and second tubular elements according to claim 16 wherein at least one of the radially inwardly and outwardly facing surfaces is tapered so as to thereby cause the frictional force between the radially inwardly and outwardly facing surfaces to be greater with the first and second tubular elements in the second relative axial position than with the first and second tubular elements in the first axial position.

20. A method of joining first and second tubular elements, said method comprising the steps of:
providing a first tubular element having a first axis, a first portion with a radially outwardly facing surface and a first connecting assembly;
providing a second tubular element having a second axis, a second portion with a radially inwardly facing surface, and a second connecting assembly;
aligning the first and second tubular elements in a preassembly state with the first and second axes substantially coincident and the first portion adjacent to the second portion;
relatively axially moving the first and second tubular elements from the preassembly state towards each other into a first relative axial position;
with the first and second tubular elements in the first relative axial position, relatively moving the first and second tubular elements around the first and second axes from a first relative rotational position into a second relative rotational position, and thereby causing the first and second connecting assemblies to cooperate so as to draw the first and second portions axially towards each other so that the first and second tubular elements achieve a second relative axial position,
wherein at least one of the radially inwardly and outwardly facing surfaces is tapered so that by reason of the tapering a frictional force generated between the radially inwardly and outwardly facing surfaces on the first and second portions is caused to be greater with the first and second tubular elements in the second relative axial position than with the first and second tubular elements in the first relative axial position, wherein the step of causing the first and second connecting assemblies to cooperate comprises causing the first and second connecting assemblies to cooperate to releasably block the first and second tubular elements in the second relative rotational position, wherein the step of causing the first and second connecting assemblies to cooperate to cooperatively releasably block the first and second tubular elements in the second relative rotational position comprises causing circumferentially facing surfaces on the first and second connecting assemblies to confront each other; and relatively moving the first and second tubular elements around the first and second axes to a third relative rotational position arrived at by moving the first and second tubular elements from the first relative rotational position to and beyond the second relative rotational position and wherein circumferentially facing surfaces in the first and second connecting assemblies confront each other to block movement of the first and second elements from the third relative rotational position back into the second relative rotational position.

21. A method of joining first and second tubular elements, said method comprising the steps of:

providing a first tubular element having a first axis, a first portion with a radially outwardly facing surface and a first connecting assembly;

providing a second tubular element having a second axis, a second portion with a radially inwardly facing surface, and a second connecting assembly;

aligning the first and second tubular elements in a preassembly state with the first and second axes substantially coincident and the first portion adjacent to the second portion;

relatively axially moving the first and second tubular elements from the preassembly state towards each other into a first relative axial position;

with the first and second tubular elements in the first relative axial position, relatively moving the first and second tubular elements around the first and second axes from a first relative rotational position into a second relative rotational position, and thereby causing the first and second connecting assemblies to cooperate so as to draw the first and second portions axially towards each other wherein the first and second tubular elements are in a second relative axial position, wherein the radially inwardly and outwardly facing surfaces are configured so that a frictional force generated between the radially inwardly and outwardly facing surfaces on the first and second portions is caused to be greater with the first and second tubular elements in the second relative axial position than with the first and second tubular elements in the first relative axial position, wherein the step of causing the first and second connecting assemblies to cooperate comprises causing the first and second connecting assemblies to cooperate to releasably block the first and second tubular elements in the second relative rotational position;

relatively axially moving the first and second tubular elements from the preassembly state towards each other into a third relative axial position that is different than the first relative axial position;

with the first and second tubular elements in the third relative axial position, relatively rotating the first and second tubular elements into a third relative rotational position wherein a frictional force generated between the radially inwardly and outwardly facing surfaces is different than a frictional force generated between the radially inwardly and outwardly facing surfaces resulting from the tubular elements changing from the first relative axial position and first relative rotational position into the second relative rotational position; and operatively connecting the tubular element to a portable fluid blower so that fluid propelled by the portable fluid blower is directed through the joined first and second tubular elements.

22. In combination:

a first tubular element having a first axis, a first portion with a radially outwardly facing surface and a first connecting assembly at a first circumferentially facing surface; and a second tubular element having a second portion with a second axis, a radially inwardly facing surface, and a second connecting assembly with a second circumferentially facing surface, the first portion extendable within the second portion so that the radially inwardly facing surface on the second tubular element surrounds the radially outwardly facing surface on the first tubular element, the first and second tubular elements positionable in a first relative axial position wherein relative movement of the first and second tubular elements around the first and second axes between a) a first relative rotational position and b) a second relative rotational position causes the first and second connecting assemblies to cooperate to draw the first and second portions axially towards each other, the first and second connecting assemblies cooperating so that the first and second circumferentially facing surfaces confront each other with the first and second tubular elements in the second relative rotational position to thereby block relative movement of the first and second tubular elements from the second relative rotational position back into the first relative rotational position, wherein the first and second tubular elements are positionable in a second relative axial position wherein relative movement of the first and second tubular elements from the first relative rotational position into the second relative rotational position causes the first and second connecting assemblies to draw the first and second portions axially towards each other further than with the first and second tubular elements in the first relative axial position and the first and second tubular elements moved from the first relative rotational position into the second relative rotational position, wherein the radially outwardly facing surface on the first tubular element and radially inwardly facing surface on the second tubular element are relatively dimensioned and at least one of the radially inwardly facing surface and radially outwardly facing surface is tapered so that by reason of the tapering the radially outwardly facing surface and radially inwardly facing surface are urged against each other with a frictional force that is greater with the first and second tubular elements in the second relative rotational position than with the first and second tubular elements in the first relative rotational position.

23. A method of joining first and second tubular elements to each other and a portable fluid blower, said method comprising the steps of:

providing a portable fluid blower;

providing a first tubular element having a first axis, a first portion with a radially outwardly facing surface and a first connecting assembly;

providing a second tubular element having a second axis, a second portion with a radially inwardly facing surface, and a second connecting assembly;

aligning the first and second tubular elements in a preassembly state with the first and second axes substantially coincident and the first portion adjacent to the second portion;

relatively axially moving the first and second tubular elements from the preassembly state towards each other into a first relative axial position;

with the first and second tubular elements in the first relative axial position, relatively moving the first and second tubular elements around the first and second axes from a first relative rotational position into a second relative rotational position, and thereby causing the first and second connecting assemblies to cooperate so as to draw the first and second portions axially towards each other so that the first and second tubular elements achieve a second relative axial position, wherein a frictional force generated between the radially inwardly and outwardly facing surfaces on the first and second portions is greater with the first and second tubular elements in the second relative axial position than with the first and second tubular elements in the first relative axial position, wherein the step of causing the first and second connecting assemblies to cooperate comprises causing the first and second connecting assemblies to cooperate to releasably block the first and second tubular elements in the second relative rotational position, wherein the step of causing the first and second connecting assemblies to cooperate to releasably block the first and second tubular elements in the second relative rotational position comprises causing circumferentially facing surfaces on the first and second connecting assemblies to confront each other, wherein the step of relatively moving the first and second tubular elements comprises causing at least a part of at least one of the first and second connecting assemblies to radially deform to thereby allow the circumferentially facing surfaces to move circumferentially up to and past each other so as to confront each other;

relatively moving the first and second tubular elements around the first and second axes to a third relative rotational position arrived at by moving the first and second tubular elements from the first relative rotational position to and beyond the second relative rotational position and wherein circumferentially facing surfaces the first and second connecting assemblies confront each other to block movement of the first and second elements from the third relative rotational position back into the second relative rotational position; and connecting the first and second tubular elements to the fluid blower so that fluid propelled by the fluid blower is directed through the first and second tubular elements.

* * * * *